US008140076B2

(12) United States Patent
Ponce de Leon et al.

(10) Patent No.: US 8,140,076 B2
(45) Date of Patent: Mar. 20, 2012

(54) METHOD FOR FACILITATING A MOBILE STATION TO PERFORM A FAST HANDOFF

(75) Inventors: Lorenzo Ponce de Leon, Lake Worth, FL (US); William P. Alberth, Jr., Prairie Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 879 days.

(21) Appl. No.: 11/957,652

(22) Filed: Dec. 17, 2007

(65) Prior Publication Data
US 2009/0156210 A1   Jun. 18, 2009

(51) Int. Cl.
*H04W 36/00* (2009.01)
(52) U.S. Cl. ............... 455/437; 455/422.1; 455/436; 455/439; 455/440; 455/442; 370/328; 370/329; 370/331; 370/332
(58) Field of Classification Search .......... 455/436–440; 370/331–332
See application file for complete search history.

(56) References Cited

U.S. PATENT DOCUMENTS

| | | | |
|---|---|---|---|
| 5,640,414 A * | 6/1997 | Blakeney et al. ............ | 375/130 |
| 6,259,917 B1 | 7/2001 | Elzein | |
| 6,859,172 B2 | 2/2005 | Powers et al. | |
| 6,957,076 B2 | 10/2005 | Hunzinger | |
| 6,978,023 B2 | 12/2005 | Dacosta | |
| 7,103,370 B1 | 9/2006 | Creemer | |
| 2003/0036389 A1 | 2/2003 | Yen | |
| 2003/0060211 A1 | 3/2003 | Chern et al. | |
| 2003/0119530 A1 | 6/2003 | Rankin | |
| 2004/0203789 A1 | 10/2004 | Hammond et al. | |
| 2005/0096026 A1 | 5/2005 | Chitrapu et al. | |
| 2006/0098588 A1 | 5/2006 | Zhang et al. | |
| 2006/0121913 A1 | 6/2006 | Lin et al. | |
| 2006/0141998 A1 | 6/2006 | Kennedy, Jr. et al. | |

(Continued)

FOREIGN PATENT DOCUMENTS

EP    1670278 A    6/2006

(Continued)

OTHER PUBLICATIONS

Third Generation Partnership Project (3GPP), "Universal Mobile Telecommunications System (UMTS); Radio Resource Control (RRC); Protocol Specification (3GPP TS 25.331 version 7.6.0 Release 7)", Oct. 2007, vol. 3-R2, Sophia Antipolis Cedex, France.

*Primary Examiner* — Rafael Perez Gutierrez
*Assistant Examiner* — Neda Behrooz
(74) *Attorney, Agent, or Firm* — Sylvia Chen (57) ABSTRACT

A method for facilitating a mobile station to perform a fast handoff in a wireless communication system allows a handoff procedure to be anticipated (by the mobile station, its serving base station, or both) based on historical information regarding prior successful handoff procedures. In operation, the mobile station receives a neighbor list from a serving base station and determines whether a member base station of the neighbor list is a successful target base station based on historical data. If the member base station is not a successful target base station, the mobile station scans the member base station, measures a signal quality associated with the member base station, and sends a measurement report for the member base station when the signal quality meets a standard signal quality threshold. If the member base station is a successful target base station, the mobile station sends the measurement report for the member base station when the measured signal quality meets a lower signal quality threshold.

13 Claims, 5 Drawing Sheets

U.S. PATENT DOCUMENTS

| | | |
|---|---|---|
| 2006/0143438 A1 | 6/2006 | Wu et al. |
| 2007/0115883 A1 | 5/2007 | Narayanan et al. |
| 2007/0178901 A1 * | 8/2007 | Williams .................. 455/439 |
| 2007/0249347 A1 * | 10/2007 | Saifullah et al. ............ 455/436 |
| 2009/0135783 A1 * | 5/2009 | Khalil et al. ................ 370/331 |

FOREIGN PATENT DOCUMENTS

| | | |
|---|---|---|
| EP | 1670278 A1 * | 6/2006 |
| WO | 03005759 A | 1/2003 |
| WO | 2005048463 A2 | 5/2005 |
| WO | 2006100653 A2 | 9/2006 |

* cited by examiner

HISTORICAL DATA 310

| PAST MS PARAMETERS FROM HISTORICAL VISITS | | | | | SUCCESSFUL BS'S FOR HANDOFF CORRESPONDING TO PAST MS PARAMETERS FROM HISTORICAL VISITS (ARRANGED AS PER DESCENDING ORDER OF WEIGHTING FACTOR) 340 | | | |
|---|---|---|---|---|---|---|---|---|
| SERVING BS (ID) 315 | SPEED (m/hr) 320 | DIRECTION (NSEW) 325 | LOCATION (LATITUDE, LONGITUDE) 330 | ROAD (ID) 335 | | | | |
| 120-1 | 42 | S->N | (35.5,-105) | ROAD XYZ | 120-4 (0.8) | 120-2 (0.6) | 120-3 (0.4) | 120-6 (0.1) |
| 120-1 | 42 | W->E | (35.5,-105) | ROAD XYZ | 120-3 (0.6) | 120-4 (0.1) | - | |
| 120-1 | 42 | E->W | (35.5,-105) | ROAD XYZ | 120-2 (0.8) | 120-4 (0.1) | - | |
| 120-4 | 42 | S->N | (48.3,-97.3) | ROAD XYZ | 120-5 (0.7) | 120-6 (0.5) | - | |
| 120-4 | 45 | N->S | (48.3,-97.3) | ROAD XYZ | 120-1 (0.2) | 120-2 (0.1) | 120-3 (0.1) | 120-5 (0.1) |
| ... | | | | | | | | |
| 120-5 | 32 | E->W | (43.6,-96.7) | ROAD XYZ | 120-4 (0.2) | 120-2 (0.1) | - | |

METHOD FOR FACILITATING A MOBILE STATION TO PERFORM A FAST HANDOFF

FIELD OF THE DISCLOSURE

The present disclosure relates generally to communication networks, and more particularly to facilitating mobile stations to perform fast handoff in communication networks.

BACKGROUND

Wireless communications networks, such as mobile wireless telephone networks, have become increasingly prevalent over the past decade. A wireless communication network, such as an infrastructure-based wireless network, typically includes a communication network with fixed and wired gateways. Many wireless networks employ a wireless device or terminal which communicates with a base station that is coupled to a wired network. The wireless device can move geographically while it is communicating over a wireless link to the base station. When the wireless device moves out of range of one base station, it may connect or "handoff" (sometimes called "handover") to a new base station and start communicating with the wired network through the new base station. In order to be ready for a potential handoff, the wireless device may continually background scan for an available base station. Wireless devices have limited energy reserves, however they must actively interface with a network to establish link and transfer data. A network environment in a wireless link is spatial, dynamic, and stochastic. Continually scanning for available base stations may place a strain on the wireless device's energy reserves and increase its power consumption which may further reduce the life span and overall performance of the wireless device.

In addition, the long latency period associated with the handoff is undesirable for wireless devices as this may prevent running of certain applications and interrupt data transfer between the wireless device and the network. The wireless device therefore expends energy and time in establishing and maintaining links prior to and after data transfers. Multimode wireless devices have the additional problem of covering many bands and interfacing with networks asynchronously, thereby adding additional load to the device's energy resources. In some cases, multimode wireless devices may be "blind" for a period of time to all the network services available at a locale. Accordingly there is a need to facilitate the wireless devices to perform fast handoff while optimizing the energy expenditure associated with establishing and monitoring links in wireless networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a method for facilitating a mobile station to perform a fast handoff in a wireless communication system. A mobile station is configured to monitor its network environment and store a history of the network environment in memory. The mobile station can use its historical data to minimize the energy spent to establish the parameters of the local network environment. In operation, the mobile station receives a neighbor list from a serving base station. The neighbor list includes a list of base station that may be neighboring to the serving base station and may include both base stations of the current network and base stations of different networks and/or different radio access technologies (RATs). The mobile station then determines whether a member base station of the neighbor list is a "successful" target base station based on historical data (i.e., that handoff to that target base station has previously been successful). If the mobile station determines that the member base station is not a successful target base station, then the mobile station background scans the member base station and measures a signal quality associated with the member base station, and further sends a measurement report for the member base station when the signal quality meets a standard signal quality threshold. In a case when the mobile station determines that the member base station is a "successful" target base station, the mobile station sends the measurement report as soon as the measured signal quality meets a signal quality threshold that is lower than the standard signal quality threshold.

Wireless Communication System

Figure 1:
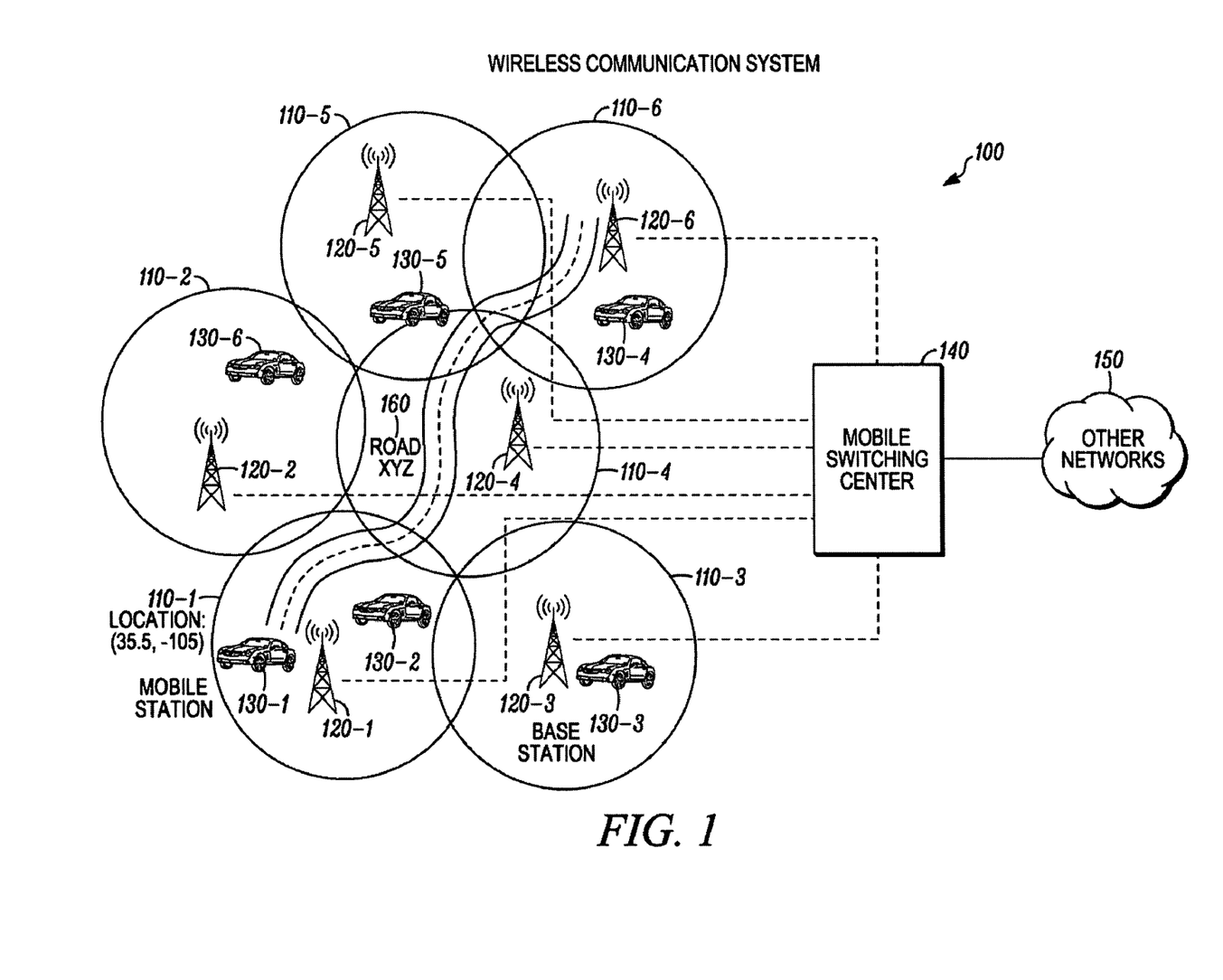
FIG. 1 is a block diagram of a wireless communication system in accordance with some embodiments.

FIG. 1 is a block diagram illustrating one example of a wireless communication system 100. The wireless communication system 100 includes a coverage area divided into a plurality of cells 110-1 through 110-n. Each cell 110-n is served by a base station 120-n. For example, as shown in FIG. 1, the cells 110-1, 110-2, 110-3, 110-4, 110-5, and 110-6 are served by their respective base stations 120-1, 120-2, 120-3, 120-4, 120-5, and 120-6. Each base station 120-n connects the mobile stations 130-n present in the corresponding cell 110-n with a communication network through a mobile switching center 140. In the example of FIG. 1, the mobile stations 130-1 and 130-2 present in the cell 110-1 are served by the base station 120-1. The mobile switching center 140 can connect the mobile station 130-1 to other networks 150 such as a public switched telephone network (PSTN). As the mobile stations 130-n move geographically across the communication system, the mobile stations 130-n can handoff to different base stations 120 of the wireless communication system 100. According to some embodiments of the present invention, the mobile stations 130-n are facilitated to perform fast handoff with the base stations 120-n as the mobile stations traverse through the cells 110-n of the wireless communication system 100. For example, the wireless communication system 100 may facilitate the mobile station 130 to perform fast handoff with each of the base stations 120-1, 120-4, and 120-5, and 120-6 when the mobile station 130-1 traverses through the cells 110-1, 110-4, 110-5, and 110-6 via road XYZ 160 as shown in FIG. 1.

Components of Mobile Station and Base Station

Figure 2:
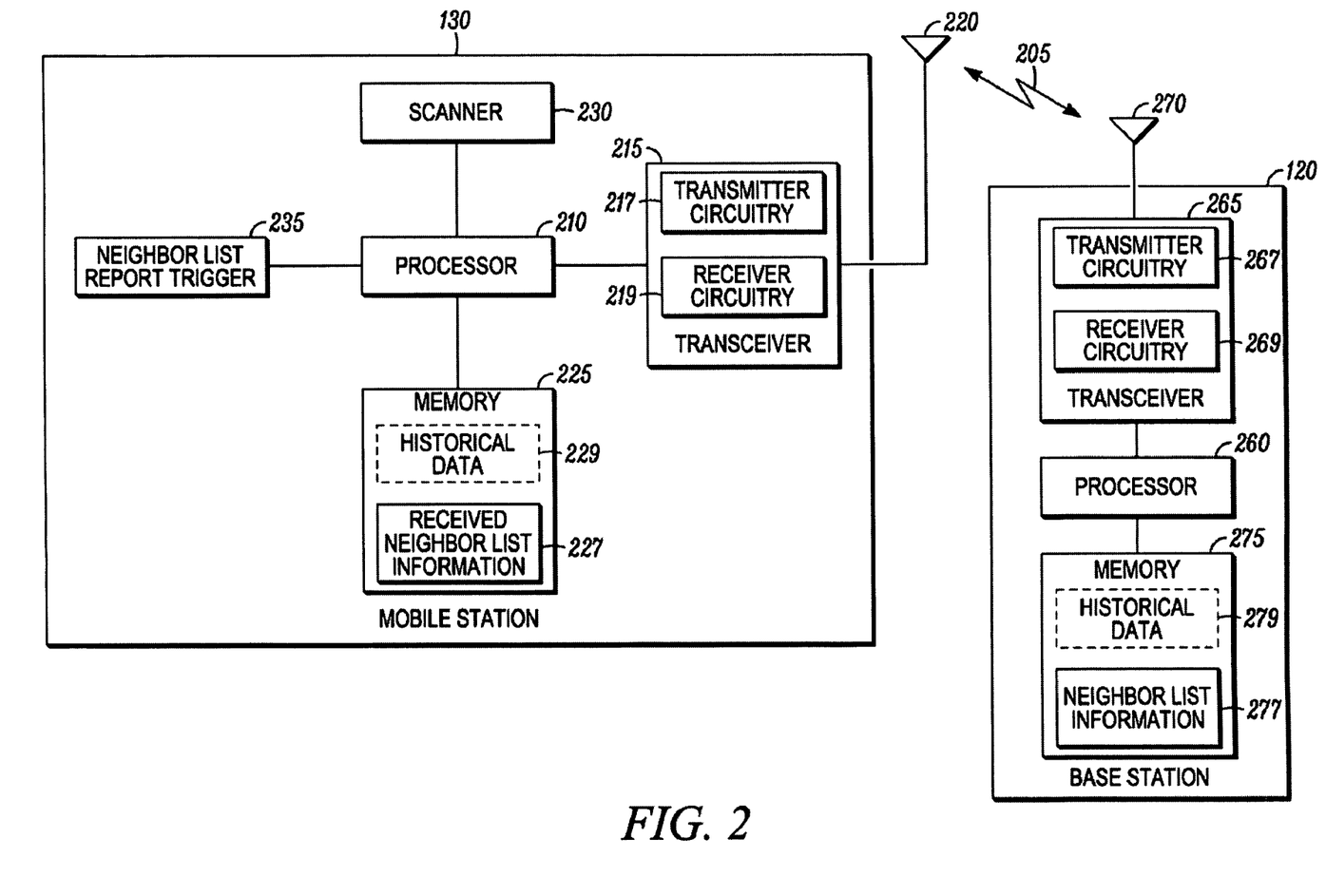
FIG. 2 is a block diagram of a mobile station in communication with a base station in accordance with some embodiments.

Now referring to FIG. 2, the mobile station 130 is shown in communication with the base station 120. The mobile station 130 and the base station 120 are in communication with each other through a radio link 205. The mobile station 130 may be any type of wireless communication device including, but not limited to, cellular, mobile, and wireless telephones; PCs (personal computers), laptop, notebook, and wearable computers with wireless modems, PDAs (personal digital assistants) with wireless modems; and pagers. For example, the mobile station 130 may include digital systems to secure fast wireless transmissions of voice and/or data.

The base station 120 may be any wireless communication station installed at a fixed location of the wireless communication system 100. The base station is sometimes referred to as a radio base station or Node B (in 3G networks), or access point base station, or an infrastructure device.

The mobile station 130 comprises a processor 210, a transceiver 215 including a transmitter circuitry 217 and a receiver circuitry 219, an antenna 220, a memory 225, a scanner 230, and the neighbor list report trigger 235. The base station 120 includes a processor 260, a transceiver 265 including a transmitter circuitry 267 and a receiver circuitry 269, an antenna 270 which may be an omni, sector, MIMO, or smart antenna array, and a memory 275. Although not shown, the base station 120 and the mobile station 130 also can include an antenna switch, duplexer, circulator, or other highly isolative means (not shown) for intermittently providing information packets from the transmitter circuitry 217, 267 to the antenna 220, 270 and from the antenna 220, 270 to the receiver circuitry 219, 269. The mobile station 130 or the base station 120 is an integrated unit containing at least all the elements depicted in FIG. 2, as well as any other elements necessary for the mobile station 130 or the base station 120 to perform its particular electronic function. For example, the mobile station 130 would include a user interface (not shown) including a display, keypad, loudspeaker, and/or microphone. Alternatively, the mobile station 130 or the base station 120 can comprise a collection of appropriately interconnected units or devices, wherein such units or devices perform functions that are equivalent to the functions performed by the elements of the mobile station 130 or the base station 120.

The base station 120 stores neighbor list information 277 in the memory 275. In one embodiment, the neighbor list information 277 includes a list of base stations that are neighboring to the base station 120. For example, the neighbor list information 277 of base station 120-4 may include base stations 120-1, 120-2, 120-3, 120-5, and 120-6. The neighbor list information 277 is periodically transmitted from the base station 120 to the mobile station 130. The mobile station 130 stores received neighbor list information 227 in the memory 225. The mobile station 130 may periodically update the received neighbor list information 227 based on the neighbor list information 277 received from the base station 120.

The scanner 230 of the mobile station 130 scans the base stations 120 listed in the received neighbor list information 227 when the mobile station 130 is in a background scanning mode, and measures the signal quality associated with the scanned base stations 120. The neighbor list report trigger 235 triggers a measurement report for a scanned base station as soon as the signal quality associated with the scanned base station meets a signal quality threshold, wherein the signal quality threshold is either a standard signal quality threshold or a lower signal quality threshold. In embodiments of the present invention, the lower signal quality threshold is simply a predetermined threshold that is lower than the standard signal quality threshold.

The processor 210, 260 includes one or more microprocessors, microcontrollers, DSPs (digital signal processors), state machines, logic circuitry, or any other device or devices that process information based on operational or programming instructions. Such operational or programming instructions are stored in the memory 225, 275. The memory 225, 275 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 210, 260 has one or more of its functions performed by a state machine or logic circuitry, the memory 225, 275 containing the corresponding operational instructions can be embedded within the state machine or logic circuitry. The operations performed by the processor 210, 260 and the other elements of the mobile station 130 and the base station 120 are described in detail below.

The transmitter circuitry 217, 267 and the receiver circuitry 219, 269 enable the mobile station 130 and the base station 120 to communicate information packets to and acquire information packets from the base stations 120 or mobile stations 130, respectively. In this regard, the transmitter circuitry 217, 267 and the receiver circuitry 219, 269 include appropriate, conventional circuitry to enable digital or analog transmissions over a wireless communication channel. One of ordinary skill in the art will recognize that most, if not all, of the functions of the transmitter circuitry 217, 267 and/or the receiver circuitry 219, 269 can be implemented in a processor, such as the processor 210, 260. However, the processor 210, 260, the transmitter circuitry 217, 267, and the receiver circuitry 219, 269 have been artificially partitioned herein to facilitate a better understanding.

The receiver circuitry 219, 269 is capable of receiving radio frequency (RF) signals from at least one frequency band using a RAT and optionally multiple frequency bands or RATs. The receiver circuitry 219, 269 can optionally comprise a first receiver and a second receiver, or one receiver capable of receiving in two or more frequency bands and/or RATs. The transceiver 215, 265 includes at least one set of transmitter circuitry 217, 267. The at least one transmitter 215, 265 can be capable of transmitting to multiple devices potentially in multiple frequency bands or RATs.

The antenna 220, 270 comprises any known or developed structure for radiating and receiving electromagnetic energy in the frequency range containing the wireless carrier frequencies. Even though only one antenna 220, 270 is shown, any number of antennas may interface with the transceiver 215, 265. Thus, the depiction of one antenna 220, 270 is not meant to be a limitation on an embodiment of the present invention.

Historical Data

Historical data 229 stored in a mobile station 130 would include at least an identification of the serving base station and the identification of the most likely target base station for handoff. The base station identification could be a BSID, a serial number, or any other identifying number. Historical data 229 in the mobile station 130 may also include current location information, direction of travel, and a history of handoffs and acquired networks associated with the location and/or direction of travel. Historical data 279 may be stored in a base station 120 or elsewhere on the network and would include information similar to historical data 229. Historical data 229 may also include a list of mobile station identifications, a history of how they have handed off through the network, and may also include information from smart antenna array settings in the base station.

The mobile station 130 and/or the base station 120 may store its respective historical data 229, 279 in memory 225, 275. In one embodiment, the historical data 229, 279 may be stored in an infrastructure within the wireless communication system, wherein the infrastructure may be a device other than the base station 120 and the mobile station 130, and further wherein the historical data 229, 279 stored in the infrastructure is accessible by the base station 120 and/or the mobile station 130.

Figure 3:
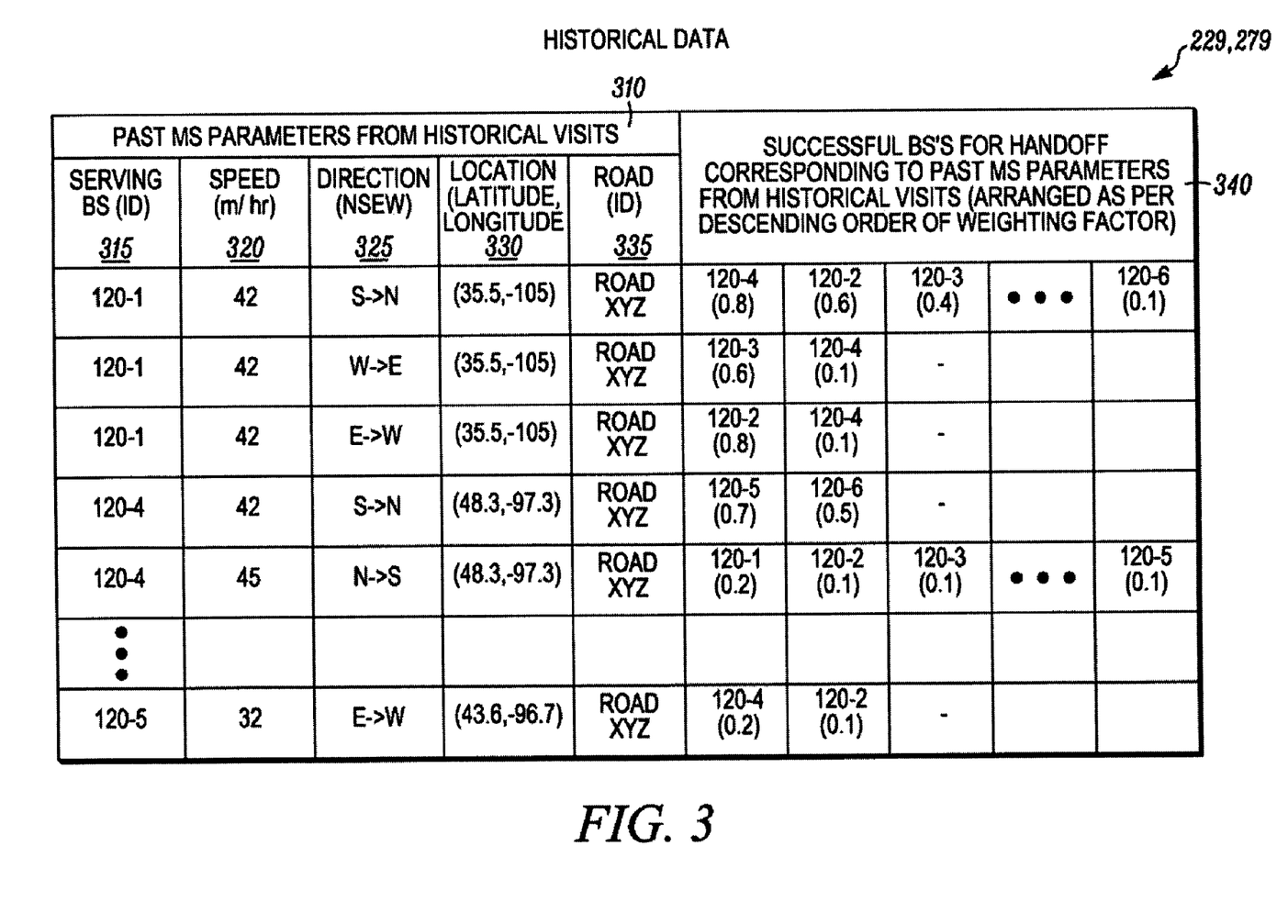
FIG. 3 is a structure of historical data in accordance with some embodiments.

Referring now to FIG. 3, an extract of a structure of the historical data 229, 279 is shown. The historical data 229, 279 includes information related to past mobile station parameters 310 which are collected during previous operation of the mobile station 130. The past mobile station parameters 310 include, but are not limited to, a serving base station identification 315, a speed 320 of the mobility of the mobile station 130, a direction 325 of the mobility of the mobile station 130, a location 135 of the mobile station 130, or one or more roads 335 traversed by the mobile station 130 during the historical visit. The historical data 229, 279 may further include smart antenna information (not shown). The smart antenna information includes information related to selected antennas from an array of antennas for communication with the base station during historical visits of the mobile station 130. In one example, the mobile station 130 may select the antenna based on a direction of arrival (DoA) of a signal associated with the serving base station.

The historical data 229, 279 may further include a list 340 of "successful" base stations for handoff corresponding to the past mobile station parameters 310 during historical visits of the mobile station 130.

Weighting Factor

In one embodiment, each of the successful base stations in the list 340 may be provided a weighting factor, wherein the weighting factor represents a historically-determined success rate of handoff of the particular mobile station 130 to the base stations 120. For example, whenever the mobile station 130 performs a successful handoff with a target base station stored in the historical data 229, 279, then the historical data 229, 279 is updated to increase the weighting factor associated with the target base station. On the other hand, when the handoff is not successful, then the historical data 229, 279 can be updated to decrease the weighting factor to reflect the unsuccessful handoff of the mobile station 130 to the target base station. In one implementation of the present invention, the weighting factor associated with the target base station remains unaltered until the mobile station performs a successful handoff with the target base station; and when the mobile station performs a successful handoff with a target base station, the weighting factor associated with the target base station is increased to reflect the successful handoff of the mobile station to the target base station.

As shown in FIG. 3 and referring to FIG. 1, according to one example, the historical data 229, 279 denotes that the mobile station 130-1 has successfully performed handoff with the base station 120-4 with a weighting factor 0.8 as against a weighting factor 0.6 for the base station 120-2. Therefore, when currently traveling with mobile station parameters that are similar to a past mobile station parameter 310 of (120-1, 42, S->N, 35.5, -105, Road XYZ . . . ), the mobile station 130-1 is most likely to perform a successful handoff with the base station 120-4 compared to the other base stations 120-n. In another example, when currently traveling with mobile station parameters that closely match the past mobile station parameter 310 of (120-5, 32, E->W, 43.6, -96.7, Road XYZ . . . ), the mobile station 130-1 may prefer handing off to base station 120-4 rather than to base station 120-2, because, for this particular past mobile station parameter, the weighting factor (0.2) for the base station 120-4 is higher than the weighting factor (0.1) associated with the base station 120-2.

Flowchart of Mobile Station Method to Facilitate Fast Handoff

Figure 4:
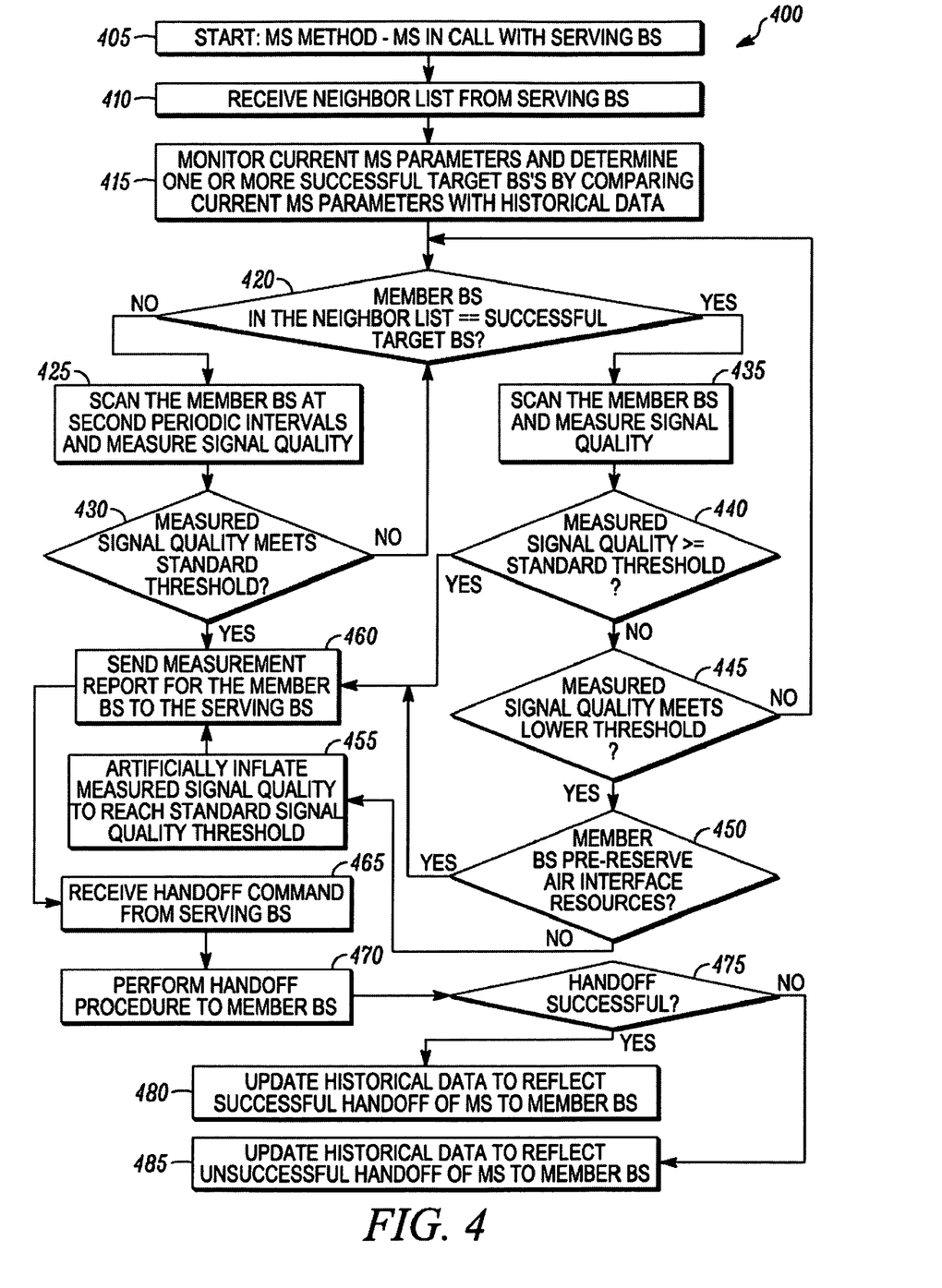
FIG. 4 is a flowchart of a method for facilitating a mobile station to perform fast handoff in accordance with some embodiments.

FIG. 4 is a flowchart of a method 400 for facilitating a mobile station 130 to perform fast handoff in accordance with some embodiments. The method 400 begins at step 405, where a mobile station 130 is in a call with a serving base station 120. At step 410, the mobile station 130 receives neighbor list information 227 from the serving base station 120. Next at step 415, the mobile station 130 monitors at least one current mobile station parameter and determines one or more successful target base stations by comparing the current mobile station parameters with its historical data 229. In one example, the mobile station 130 determines one or more successful target base stations by monitoring at least one current mobile station parameter including, but not limited to, a serving base station identification, smart antenna information, a speed of the mobility of the mobile station 130, a direction of mobility of the mobile station 130, a location of the mobile station 130, and comparing the at least one current mobile station parameter with at least one past mobile station parameter 310 in the historical data 229. In one embodiment, a historical base station included in the historical data 229 is a successful target base station when a weighting factor associated with the historical base station exceeds a predefined weighting factor, and further when the at least one current mobile station parameter matches the at least one past mobile station parameter 310. The predefined weighting factor may be different depending on the cell 110-n the mobile station 130 is currently associated with.

Next at step 420, the mobile station 130 determines whether a member base station in the received neighbor list information 227 is a (previously) successful target base station. If the member base station is not the successful target base station, then at step 425, the mobile station 130 background scans the member base station and measures a signal quality associated with the member base station. As can be appreciated by a person of ordinary skill in the art, step 425 is a periodic process and therefore, the mobile station 130 may re-scan the member base station after a first time period interval ($T_1$). At step 430, the mobile station 130 determines whether the measured signal quality for the member base station meets the standard signal quality threshold. If the measured signal quality threshold does not meet the standard signal quality threshold, then the mobile station 130 proceeds to determine if a next member base station in the neighbor list 227 is a successful target base station as shown in step 420. On the other hand, if the mobile station determines that the measured signal quality threshold meets the standard signal quality threshold, then the mobile station 130 proceeds to step 460 and sends a measurement report for the member base station to the serving base station 120.

Referring back to step 420, if the mobile station 130 determines that the member station is a (previously) successful target base station, then at step 435, the mobile station 130 background scans the member base station and measures a signal quality associated with the member base station. As can be appreciated by a person skilled in the art, step 435 is a periodic process, and therefore, the mobile station 130 may re-scan the member base station after a second time period interval ($T_2$). In this embodiment, the second time period ($T_2$) is shorter than the first time period interval ($T_1$) i.e. $T_2<T1$. Next at step 440, the mobile station 130 determines whether the measured signal quality threshold meets the standard signal quality threshold. If the measured signal quality threshold meets the standard signal quality threshold, then the mobile station 130 proceeds to step 460 to send a measurement report for the member base station to the serving base station. On the other hand, if the measured signal quality threshold does not meet the standard signal quality threshold, then at step 445, the mobile station 130 determines whether the measured signal quality threshold meets the lower signal quality threshold. If the measured signal threshold does not meet the lower signal quality threshold, then the mobile station 130 proceeds to step 420 to determine if a next member base station in the neighbor list 227 is a successful target base station.

Referring back to step 445, when the mobile station 130 determines that the measured signal quality threshold meets the lower signal quality threshold, then the mobile station proceeds to step 450 to determine whether the member base station is capable of pre-reserving air interface resources. If the member base station is capable of pre-reserving air interface resources, then the mobile station 130 proceeds to step 460 to send a measurement report for the member base station to the serving base station. On the other hand, if the member base station is not capable of pre-reserving air interface resources, then at step 455, the mobile station 130 artificially inflates the measured signal quality measurement to reach the standard signal quality threshold. Next at step 460, the mobile station 130 sends the artificially inflated measurement report for the member base station to the serving base station.

Next at 465, the mobile station 130 receives a handoff command from the serving base station in response to the measurement report for the member base station. The mobile station 130 then proceeds to step 470 to perform a handoff procedure with the member base station. Next at step 475, the mobile station 130 determines whether the handoff to the member base station is successful. If the handoff to the member base station is successful, then the mobile station 130 updates the historical data 229 to reflect successful handoff of the mobile station 130 to the member base station. In one example, the mobile station 130 updates the historical data 229 by increasing the weighting factor associated with the member base station. In one embodiment, if the weighting factor associated with a target base station increases beyond an upper weighting factor threshold, then the weighting factor is not increased even if there are subsequent successful handoffs of the member base station to the target base station. On the other hand, if the handoff to the member base station is not successful, then the mobile station 130 updates the historical data 229, 279 to reflect unsuccessful handoff of the mobile station to the member base station. In one example, the mobile station 130 updates its historical data 229 by decreasing the weighting factor associated with the member base station. In another example, if the weighting factor associated with a target base station decreases below a lower weighting factor threshold, then the weighting factor is not decreased even if there are subsequent unsuccessful handoffs to the target base station.

Flowchart of Base Station Method to Facilitate Fast Handoff

Figure 5:
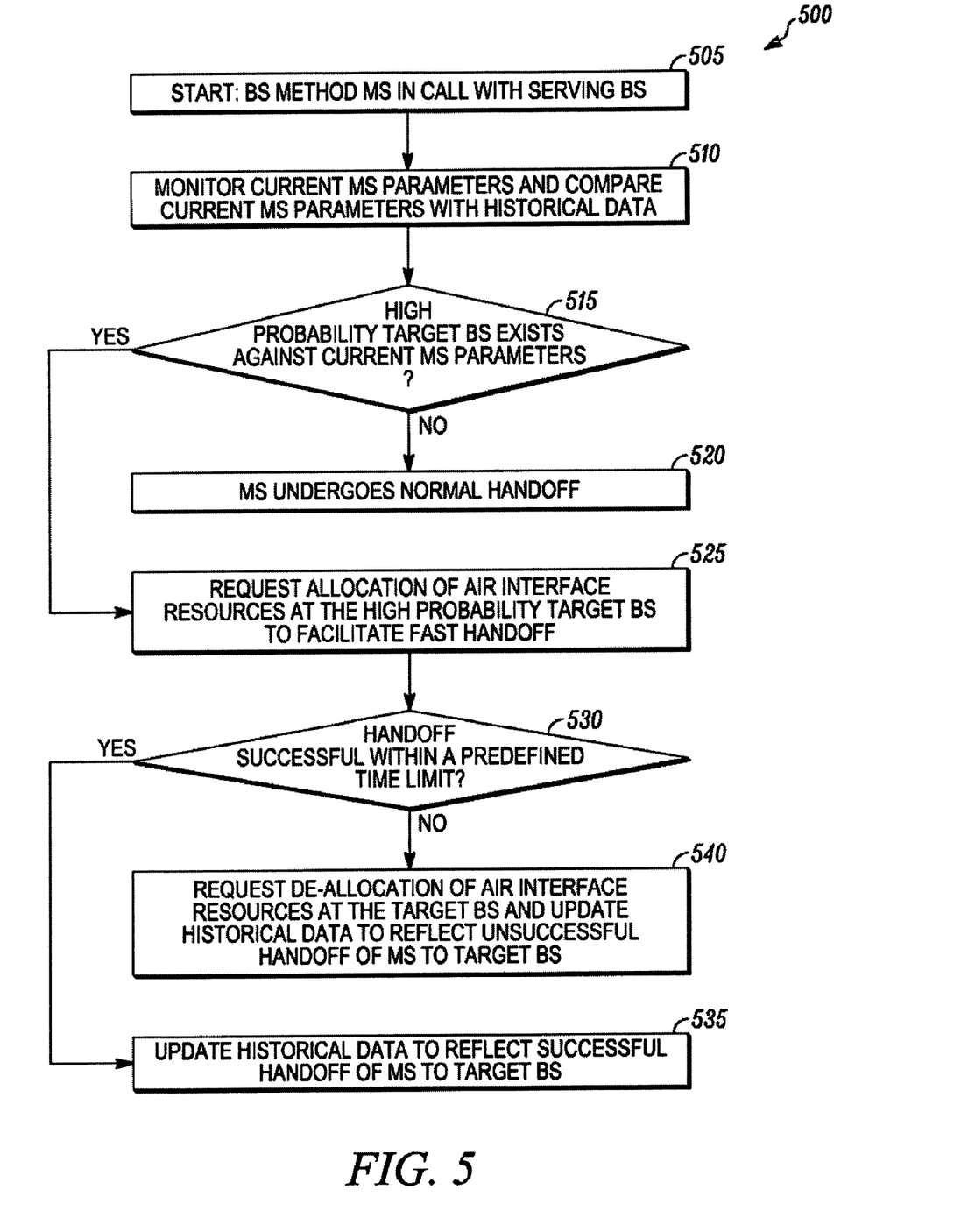
FIG. 5 is a flowchart of a method for a base station to facilitate a mobile station to perform fast handoff in accordance with some embodiments.

FIG. 5 is a flowchart of a method 500 for a base station 120 to facilitate a mobile station 130 to perform fast handoff in accordance with some embodiments. The method begins at step 505, where a mobile station 130 is in a call and served by a base station 120. At step 510, the base station 120 monitors current mobile station parameters and compares the current mobile station parameters with its historical data 279. Next at step 515, the base station 120 determines whether a high probability target base station exists by comparing the current mobile station parameter(s) with historical mobile station parameters 310. The high probability target base station would be the target base station with the highest weighting factor and may require the weighting factor to exceed a predefined threshold. In an alternate embodiment, any base stations which have weighting factors that exceed a threshold may be considered a high probability target base station. In one example, the base station 120 determines a high probability target base station by examining at least one of a serving base station identification, smart antenna information, a speed of the mobility of the mobile station 130, a direction of mobility of the mobile station 130, or a location of the mobile station 130, and comparing the at least one current mobile station parameter with at least one past mobile station parameter 310 in the historical data 279. If a high probability target base station does not exist for the current mobile station parameter(s), then at step 520, the base station 120 facilitates the mobile station 130 to undergo normal handoff using standard handoff procedures.

On the other hand, if the base station 120 determines that a high probability target base station exists for the current mobile station parameter, then the base station 120 anticipates that the mobile station 130 will handoff to the high probability target base station prior to the mobile station 130 reporting reception of signals from the high probability target base station. Next at step 525, the base station 120 requests allocation of air interface resources at the high probability target base station to facilitate the mobile station 130 to undergo fast handoff with the high probability target base station.

Next at step 530, the base station 120 determines whether the handoff of the mobile station 130 to the high probability target base station is successful within a predetermined time period. If the handoff of the mobile station 130 to the high probability target base station is successful within the predetermined time period, the base station 120 updates the historical data 279 to reflect a successful handoff of the mobile station 130 to the high probability target base station. In one example, the base station 120 updates the historical data 279 by increasing the weighting factor associated with the high probability target base station. In one embodiment, if the weighting factor associated with a target base station increases beyond an upper weighting factor threshold, then the weighting factor is not increased even if there are subsequent successful handoffs of the mobile station 130 to the high probability base station. On the other hand, if the base station 120 determines that the handoff of the mobile station 130 to the high probability target base station is not successful within the predefined time period, then at step 540, the base station 120 requests de-allocation of the air interfaces at the high probability base station and updates the historical data 279 to reflect unsuccessful handoff of the mobile station 130 to the high probability target base station. In one example, the mobile station 130 updates the historical data 229 by decreasing the weighting factor associated with the high probability target base station. In one embodiment, if the weighting factor associated with the high probability target base station decreases below a lower weighting factor threshold, then the weighting factor is not decreased even if there are subsequent unsuccessful handoffs of the mobile station 130 to the high probability target base station.

Thus, the mobile station is facilitated to perform handoff with a target base station as quickly as possible, thereby reducing the long latency period associated with the handoff. Additionally, by attempting handoff to a target base station that has historically been successful under similar mobile station circumstances, the probability of a dropped call is reduced. Various implementation of the present invention further reduces the strain on the mobile station's energy reserves used for background scanning while optimizing the energy expenditure associated with establishing and monitoring links in wireless networks.

In implementations where a high probability target base station pre-reserves air interface resources in anticipation of a mobile station being handed off to it, the pre-reservation of air interface resources is offset by a high probability of a handoff procedure completing successfully within a predefined time limit. Without pre-reservation, in some network topographies, a user would experience a dropped call.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for facilitating a mobile station to perform a fast handoff, comprising:
 obtaining a neighbor list, the neighbor list including a list of member base stations;
 determining whether a member base station of the neighbor list is a successful target base station based on historical data;
 if the member base station is not the successful target base station, scanning the member base station and measuring a signal quality associated with the member base station, and sending a measurement report for the member base station when the signal quality meets a standard signal quality threshold; and if the member base station is the successful target base station, scanning the member base station and measuring the signal quality associated with the member base station, determining whether the member base station can pre-reserve air interface resources, and if the member base station can pre-reserve air interface resources, sending the measurement report for the member base station when the signal quality meets a lower signal quality threshold, wherein the lower signal quality threshold is lower than the standard signal quality threshold.

2. The method of claim 1, wherein if the member base station is the successful target base station, further comprising:

re-scanning the member base station after a first time period interval, after scanning the member base station.

3. The method of claim 2, wherein if the member base station is not the successful target base station, further comprising re-scanning the member base station after a second time period interval, after scanning the member base station, wherein the first time period interval is shorter than the second time period interval.

4. The method of claim 1, wherein the determining comprises:

monitoring at least one current mobile station parameter, wherein the at least one current mobile station parameter relates to at least one of: a serving base station identification, smart antenna information, a speed of mobility of the mobile station, a direction of mobility of the mobile station, or a location of the mobile station, and comparing the at least one current mobile station parameter with at least one past mobile station parameter in the historical data.

5. The method of claim 4, wherein a historical base station included in the historical data is the successful target base station, when a weighting factor associated with the historical base station exceeds a predefined weighting factor and further when the at least one current mobile station parameter matches the at least one past mobile station parameter.

6. The method of claim 1, further comprising:

receiving a handoff command from a serving base station, and performing a handoff procedure to the member base station, wherein when the handoff procedure to the member base station is successful, updating the historical data to reflect a successful handoff of the mobile station to the member base station.

7. The method of claim 6, wherein the updating comprises:

increasing a weighting factor in the historical data associated with the member base station.

8. The method of claim 6, wherein, when the handoff procedure to the member base station is not successful, updating the historical data to reflect an unsuccessful handoff of the mobile station to the member base station.

9. The method of claim 8, wherein the updating the historical data to reflect an unsuccessful handoff of the mobile station to the member base station comprises:

decreasing a weighting factor in the historical data associated with the member base station.

10. The method of claim 1, wherein the historical data includes a weighting factor associated with the member base station which exceeds a predefined weighting factor.

11. The method of claim 1, wherein when the member base station is the successful target base station, and further when the signal quality meets the lower signal quality threshold, comprising:

artificially inflating a signal quality measurement to reach the standard signal quality threshold if the member base station cannot pre-reserve air interface resources before sending the measurement report for the member base station.

12. The method of claim 1, wherein the mobile station is in a background scanning mode, and further if the member base station is not the successful target base station and when the signal quality does not meet the standard signal quality threshold, returning to the determining whether a next member base station in the neighbor list is a successful target base station based on historical data.

13. The method of claim 1, wherein the mobile station is in a background scanning mode, and further if the member base station is the successful target base station and when the signal quality does not meet the lower signal quality threshold, returning to the determining whether a next member base station in the neighbor list is a successful target base station based on historical data.

* * * * *